United States Patent
Singh et al.

(10) Patent No.: US 7,693,699 B2
(45) Date of Patent: Apr. 6, 2010

(54) INCREMENTAL UPDATE OF VIRTUAL DEVICES IN A MODELED NETWORK

(75) Inventors: Pradeep K. Singh, Arlington, VA (US); Raymond Onley, Hagerstown, MD (US); Nishant Gupta, Rockville, MD (US); Alain J. Cohen, Washington, DC (US)

(73) Assignee: OPNET Technologies, Inc., Bethesda, MD (US)

( * ) Notice: Subject to any disclaimer, the term of this patent is extended or adjusted under 35 U.S.C. 154(b) by 860 days.

(21) Appl. No.: 11/503,553

(22) Filed: Aug. 11, 2006

(65) Prior Publication Data

US 2007/0067351 A1 Mar. 22, 2007

Related U.S. Application Data

(60) Provisional application No. 60/709,774, filed on Aug. 19, 2005.

(51) Int. Cl.
G06F 17/50 (2006.01)
(52) U.S. Cl. .................... 703/13; 709/223; 707/203
(58) Field of Classification Search ............. 703/13, 703/20–23; 709/223–226; 707/200, 203
See application file for complete search history.

(56) References Cited

U.S. PATENT DOCUMENTS

2003/0025984 A1* 2/2003 Gudeman et al. ........... 359/291
2004/0002880 A1* 1/2004 Jones ............................ 705/7
2006/0025981 A1* 2/2006 Papaefstathiou et al. ...... 703/17
2006/0025984 A1* 2/2006 Papaefstathiou et al. ...... 703/22
2007/0058570 A1* 3/2007 Singh et al. ................ 370/254

OTHER PUBLICATIONS

Beynon et al., M. Efficient Manipulation of Large Datasets on Heterogeneous Storage Systems, Proceedings of the IEEE Parallel and Distributed Processing Symposium, Apr. 2002, pp. 84-96.*

* cited by examiner

*Primary Examiner*—Russell Frejd

(57) ABSTRACT

In a network simulation system, a compiler is provided to support incremental updates to the configuration data associated with the modeled network. Each incremental change is identified and logged, to facilitate configuration management and select roll-backs to prior configurations. Because each update is processed and managed individually, and integrated automatically into the overall system configuration, the overhead associated with keeping a configuration database up-to-date is substantially reduced, thereby increasing the likelihood that all configuration changes will be reflected in the modeled network. In a preferred embodiment, the same data is used to incrementally update the configuration model and to execute the change in the actual system, thereby further reducing the overhead and assuring a correspondence between the modeled network and the actual network.

51 Claims, 2 Drawing Sheets

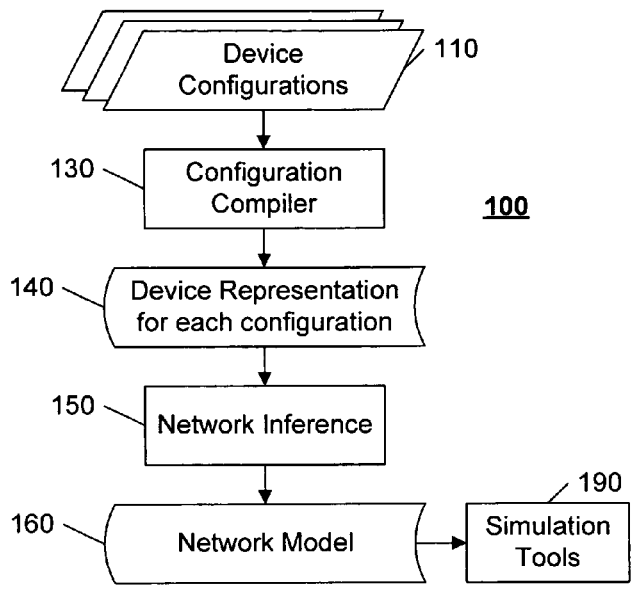
FIG. 1 [Prior Art]
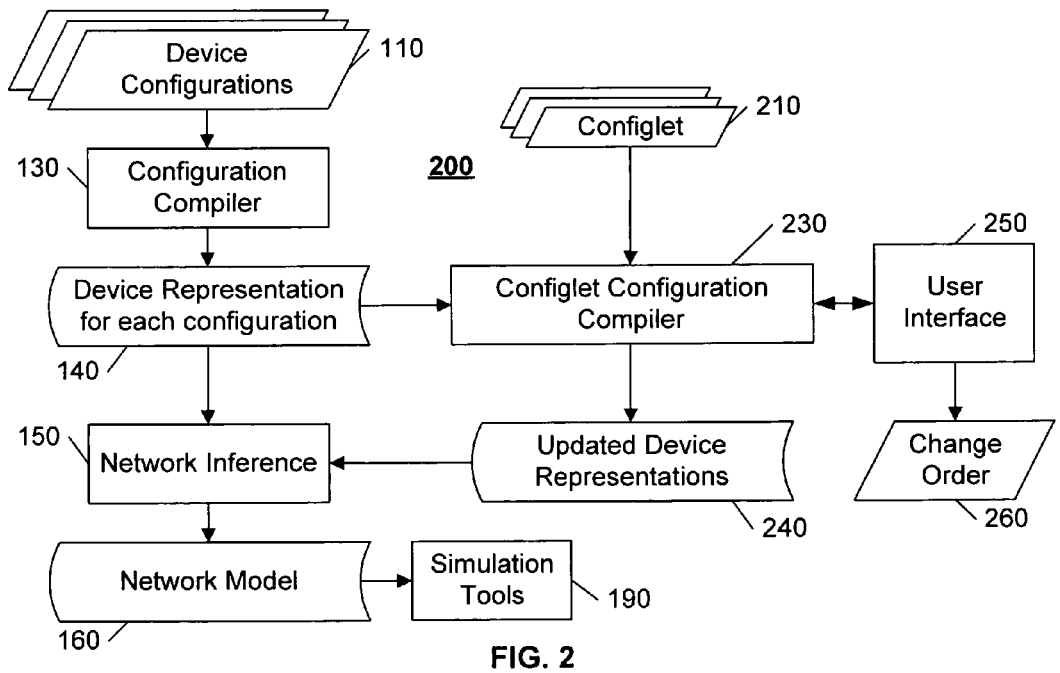
FIG. 2

INCREMENTAL UPDATE OF VIRTUAL DEVICES IN A MODELED NETWORK

This application claims the benefit of U.S. Provisional Patent Application No. 60/709,774, filed 19 Aug. 2005.

BACKGROUND AND SUMMARY OF THE INVENTION

This invention relates to the field of network analysis, and in particular to a method and system that facilitates the updating of virtual devices, such as switches and routers, in a network that is modeled for a network simulator or other network analysis tool.

Network managers often use models of their network to assess proposed changes to the network, or to contrast the performance of the actual network to the 'idealized' performance of the modeled network.

FIG. 1 illustrates an example conventional network analysis system, wherein a network of devices is modeled for execution on a variety of simulation tools 190. A plurality of devices form the nodes of the network, and the configuration of these devices define how these devices are configured to communicate with each other. The device configuration data 110 will generally include the parameters related to the communication of data to and from each device, including, for example, the address of the node, the protocols used, and the parameters and options associated with the protocols, such as routing and switching parameters, failure recovery and security options, system management details, and so on. If the device includes multiple communication modes or channels, the configuration data 110 includes sets of parameters for each mode or channel.

A configuration compiler 130 transforms the configuration data in the configuration database 110 into a processable form 140 that represents each device in the network. A network inference engine 150 processes the device representations to infer the topology of the network and to create a network model 160 that is suitable for simulation 190.

The simulator 190 is commonly used to perform 'what-if' analyses, wherein a proposed change to the network is modeled via one or more changes to the device configuration 110. If the modeled change exhibits the expected change (e.g. a performance increase or enhanced security), the actual network of devices is correspondingly updated to conform to the modeled network, and the changed configuration 110 is stored as the new 'baseline' configuration for the current network. If the simulation demonstrates unexpected performance, on the other hand, the proposed changes are removed from the configuration database 110, typically by restoring the configuration parameters in the database 110 to their prior state. In many instances, however, because changes to an operational network are generally an ongoing sequence of changes, a restoration of the model to a prior configuration may required going beyond the immediately prior model to effect the restoration. Although sets of backup copies of the device configuration database may be maintained, it is often difficult to identify the particular changes associated with each backup. Generally, processes and policies put in place to manage such changes, by requiring each person to document each change, for example, but often these processes and policies are not strictly adhered to.

Additionally, device configuration database 110 for most non-trivial networks are quite large, and complex. The task of adding a change to the database 110 can be daunting, and the time required to recompile the configuration database 110 can be substantial. In such cases, changes are often effected in the actual network without first modeling the proposed change. Often, for example, a local support engineer may propose and/or implement an upgrade to the configuration of equipment at a node, such as "reconfigure router 'abc' to restrict traffic per access table A". In many instances, the overhead associated with finding and editing the appropriate entry in database 110 to effect this modeled reconfiguration, and performing a successful recompilation is substantially greater than the time and effort required to actually reconfigure the component in the actual network, and the local update is not incorporated into the configuration database 110.

It is an objective of this invention to provide a method and system that eases the task of configuration management of complex networks. It is a further objective of this invention to provide a method and system that facilitates 'what-if' analyses of configuration changes in complex networks without substantial overhead.

These objectives, and others, are achieved by a method and system that facilitates incremental updates to configuration data of modeled networks. Each incremental change is identified and logged, to facilitate configuration management and to facilitate select roll-backs to prior configurations. Because each update is processed and managed individually, and integrated automatically into the overall system configuration, the overhead associated with keeping a configuration database up-to-date is substantially reduced, thereby increasing the likelihood that all configuration changes will be reflected in the modeled network. In a preferred embodiment, the same data is used to incrementally update the configuration model and to execute the change in the actual system, thereby further reducing the overhead and assuring a correspondence between the modeled network and the actual network.

BRIEF DESCRIPTION OF THE DRAWINGS

The invention is explained in further detail, and by way of example, with reference to the accompanying drawings wherein:

FIG. 1 illustrates an example block diagram of a prior art network simulation system.

FIG. 2 illustrates an example block diagram of a network simulation system that accommodates incremental changes to device configuration data in accordance with this invention.

Throughout the drawings, the same reference numerals indicate similar or corresponding features or functions. The drawings are included for illustrative purposes and are not intended to limit the scope of the invention.

DETAILED DESCRIPTION

Figure 3:
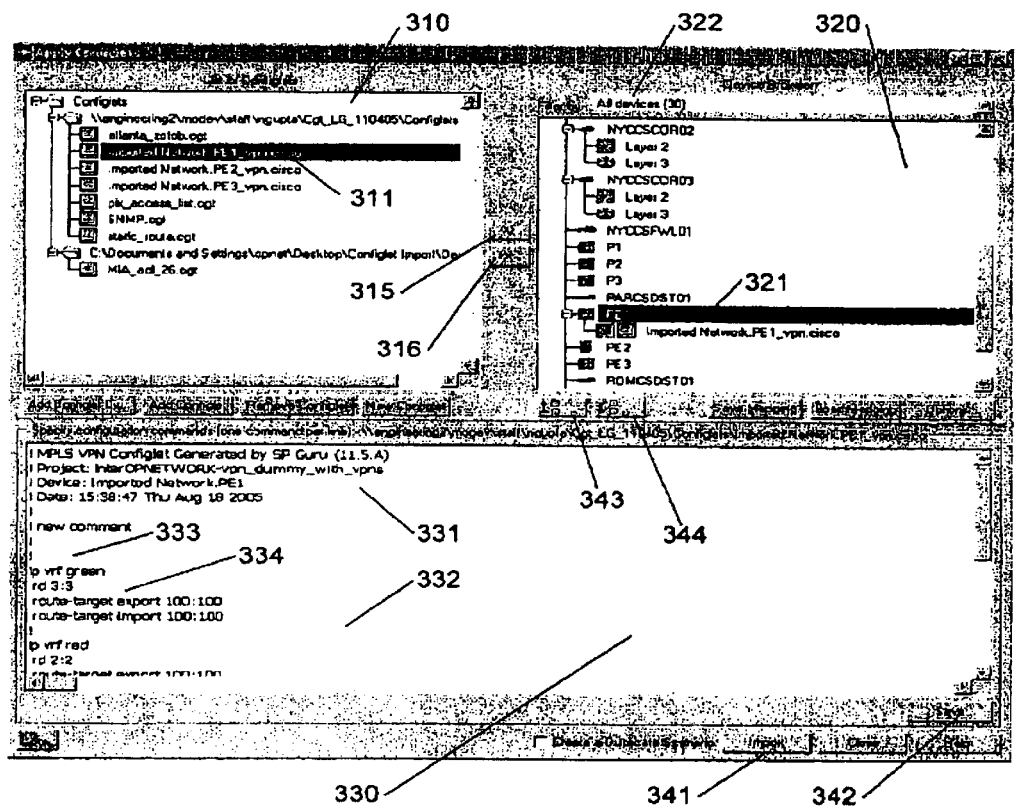
FIG. 3 illustrates an example user interface that facilitates the management of network configuration data.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

FIG. 2 illustrates an example block diagram of a network simulation system 200 that accommodates incremental updates to the configuration data of modeled devices in the modeled network. As in the conventional network simulation system 100 of FIG. 1, the system 200 includes a configuration compiler 130 that compiles the configuration data 110 of the modeled devices in the network into a processable form 140 representing each device in the network. This configuration data 110 is herein termed the 'baseline' configuration, for ease of reference, and generally corresponds to a dataset that has been verified as corresponding to the configuration of the devices in the actual network.

When changes are proposed for the network, the device configuration data 110 can be updated to reflect these changes. However, as noted above, device configuration databases 110 for most non-trivial networks are quite large, and complex, and the task of adding a change to the database 110 can be daunting. Additionally, such direct editing of the configuration data 110 can lead to inconsistencies, as proposed changes are accepted or rejected, or multiple concurrent edits are attempted, and so on.

In accordance with this invention, proposed changes are reflected in 'configlets' 210, so called because the changes typically refer to only a small subset of a device's configuration. Parameters or other configuration data included in a configlet 210 replace or supercede the data contained in the original, baseline device configuration data 110. If a proposed change is rejected, typically based on the simulation of the model with this change, the corresponding configlet can easily be removed from the set of configlets 210 that generate future models 160.

An incremental compiler 230 is configured to compile the configlets 210, independent of the device configuration data 110. Although illustrated as a separate entity for ease of understanding, one of ordinary skill in the art will recognize that the incremental compiler 230 may be included within a single compiler module that includes both the baseline compiler 130 and the incremental compiler 230.

As noted above, the configlets 210 generally correspond to proposed changes to the device configuration, so that the performance or other characteristics of the network can be verified via the simulator 190 before the change is effected in the actual network. Each configlet 210 may contain a change to one or more configuration parameters of a device, or a change to one or more parameters of multiple devices, or a combination of both.

In a preferred embodiment, the incremental compiler 230 assesses each configlet 210 to determine which devices are affected by the configlet. The device configuration for each affected device is extracted from the device representation database 140, and the directives of the configlet are applied to each affected device to create a set of updated device representations 240. That is, the configlet 210 need not contain all of the configuration parameters of the affected device, and need only contain the parameters that are to be changed. Optionally, a new device may be added via a configlet 210, at which point the compiler 230 would not extract the configuration from the device representation database 140, and the configlet 210 would need to contain any required non-default configuration parameters.

The network inference engine 150 is configured to incorporate these new device representations 240 into the network model 160, preferably without recompiling the baseline device representations 140.

Of particular note, because the incremental compiler 230 is configured to process individual changes, without requiring the user to access and change the device configuration database, each configlet 210 can be generated and processed quickly, thereby encouraging the creation and processing of such change records 210 and improving the management and control of the network. Additionally, each change/configlet can be selectively removed, should adverse effects in the actual or simulated network become evident.

Additionally, as noted above, the processing of the incremental configlets generally will not require the recompilation of the entire device configuration database 110, the number of configlets 210 pending before incorporation into a new baseline device configuration database 110 can be substantial, thereby allowing for extended time periods between updates of the baseline database 110. In a preferred embodiment, each configlet 210 is date-time-stamped, so that the configuration can optionally be reset to a given point in time. A user interface 250 is provided to facilitate the tracking and selection of each configlet, or group of configlets, as discussed further below.

FIG. 3 illustrates an example arrangement of a user interface for managing configuration data in accordance with this invention. The window 310 illustrates a list of available configlets. In this example, the entries in the list are arranged by the devices in the network to which one or more of the configlets applies. For example, the highlighted entry 311 indicates the occurrence of a configlet for device/node "Imported Network.PE1".

In the window 320, the modeled network is illustrated, using a conventional hierarchical presentation. The highlighted entry 321 corresponds to the network device PE1 in the network. The devices displayed in the window 320 can be filtered via the "Filter By:" drop down menu 322. The user can thus choose to display all devices, as shown, or a subset of the available devices in the modeled network. The selectable subsets could be defined by device types, manufacturers, or any other attributes. In one embodiment, not shown, the user interface includes a search field in which users can input full or partial device names and also regular expressions. The window 320 would then display only those devices satisfying the search criteria input by the user.

When both the device 321 and the configlet 311 are highlighted, the user can assign this configlet 311 to the device 321 by clicking on the ">>" assign button 315. Each of the configlets applied to the device are illustrated below the device in the order in which these configlets are applied or have to be applied. This order can easily be changed 260 via user selection of either the move-up button 343 or move-down button 344. Configlets can be removed from the network model by clicking on the "X" unassign button 316. The system keeps track of the newly assigned or unassigned configlets, and applies/removes these configlets to create a new network model when the user selects the "Import" button 341.

As noted above, a configlet can be applied to more than one device at the same time, and multiple configlets can be applied to a single device. In a preferred embodiment, configlets may be organized as configlet sets, and devices may be organized as device sets, so as to facilitate the application/removal of a set of configlets to/from one or more devices, one or more configlets to/from a set of devices, and/or a combination of both.

The window 330 is configured to illustrate the content of the configlet. The first few lines 331 are comments regarding the content of the configlet, its creation time, source, and so on. The next few lines 332 are the configuration commands, which in this example, will create a new VRF instance 333 and specifying its parameters such as route distinguisher and route targets 334. In a preferred embodiment, the window 330 is configured to allow the selected configlet to be modified, and new configlets created. Preferably, if a configlet has previously been applied, the modified configlet should be saved as a new configlet; thereafter, the prior configlet is unassigned 316 and the new configlet assigned 315, as discussed above. The "Save" button 342 effects a storage of the configlet and any modifications made to it.

Not illustrated in FIG. 3, the user is also provided the option of applying one or more selected configlets directly to the devices in the actual network. In this way, the same change data (configlet 210) that is verified by simulation model that is created by the change data is used to provide the actual changes. Also in a preferred embodiment, the user interface allows a user to create a new 'baseline' configuration (110 in FIG. 2), based on the original baseline configuration and selected configlets, so that subsequent changes can be referenced to this new baseline.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements.

We claim:

1. A system that comprises a compiler that is configured to:
   receive a baseline set of configuration data associated with one or more devices in a modeled network,
   receive, independent of the baseline set and independent of each other, one or more configuration data items associated with the one or more devices,
   produce a configuration dataset corresponding to the baseline set of configuration data and the one or more configuration data items, without a corresponding modification to the baseline set,
   compile the baseline set and produce therefrom a baseline dataset, and
   produce the configuration dataset by modifying the baseline dataset based on the one or more configuration data items.

2. The system of claim 1, wherein the compiler includes a consistency checker that is configured to identify inconsistencies between and among the baseline set and the one or more configuration data items.

3. The system of claim 1, including a network simulator that is configured to simulate the modeled network using the configuration dataset to control operation of the one or more devices in the modeled network.

4. The system of claim 1, including a user interface that is configured to facilitate identification of each of the one or more configuration data items.

5. The system of claim 4, wherein the user interface is configured to display:
   a list of each of the one or more configuration data items, and
   a list of each of the one or more devices in the modeled network.

6. The system of claim 5, wherein the user interface is configured to facilitate selection of one or more select configuration data items of the one or more configuration data items, and to identify one or more select devices of the one or more devices corresponding to the one or more select configuration data items.

7. The system of claim 6, wherein the user interface is configured to facilitate editing of the one or more select configuration data items.

8. The system of claim 7, wherein the user interface is configured to facilitate creation of new configuration data items for inclusion in the one or more configuration data items.

9. The system of claim 8, wherein the user interface is configured to facilitate creation of instructions for modifying configuration settings in an actual device in an actual network corresponding to the modeled network.

10. The system of claim 4, wherein the user interface is configured to facilitate selection of one or more select configuration data items.

11. The system of claim 4, wherein the user interface is configured to facilitate editing of one or more select configuration data items.

12. The system of claim 4, wherein the user interface is configured to facilitate creation of new configuration data items for inclusion in the one or more other configuration data items.

13. The system of claim 4, wherein the user interface is configured to facilitate creation of instructions for modification of configuration settings in an actual device in an actual network corresponding to the modeled network.

14. The system of claim 4, wherein the user interface includes one or more filters that are configured to identify a select set of devices from the one or more devices.

15. The system of claim 14, wherein the compiler is configured to provide an other configuration dataset based on the select set of devices.

16. The system of claim 14, wherein the user interface is configured to delete one or more configuration data items of the one or more configuration data items based on the select set of devices.

17. The system of claim 4, wherein each of the one or more configuration data items includes a time-based indicator, and the user interface includes one or more filters that are configured to identify a select set of configuration data items based on the time-based indicator of each of the one or more configuration data items.

18. The system of claim 17, wherein the user interface is configured to create a new baseline set of configuration data items based on the select set of configuration data items.

19. The system of claim 17, wherein the user interface is configured to modify an ordering of the one or more configuration data items based on the select set of configuration data items.

20. The system of claim 17, wherein the compiler is configured to provide an other configuration dataset based on the select set of configuration data items.

21. The system of claim 17, wherein the user interface is configured to delete one or more configuration data items of the one or more configuration data items based on the select set of configuration data items.

22. A method comprising:
receiving, at a network analysis machine, a baseline set of configuration data associated with one or more devices in a modeled network,
receiving, independent of the baseline set and independent of each other, one or more configuration data items associated with the one or more devices, and
producing, by the network analysis machine, a configuration dataset corresponding to the baseline set of configuration data and the one or more configuration data items, without a corresponding modification to the baseline set,
wherein producing the configuration dataset includes:
compiling the baseline set to produce therefrom a baseline dataset, and
modifying the baseline dataset based on the one or more configuration data items.

23. The method of claim 22, wherein producing the configuration dataset includes identifying inconsistencies between and among the baseline set and the one or more configuration data items.

24. The method of claim 22, including simulating the modeled network using the configuration dataset to control operation of the one or more devices in the modeled network.

25. The method of claim 22, including displaying a list of each of the one or more configuration data items, and a list of each of the one or more devices in the modeled network.

26. The method of claim 25, including receiving a selection of one or more select configuration data items of the one or more configuration data items, and identifying one or more select devices of the one or more devices corresponding to the one or more select configuration data items.

27. The method of claim 22, wherein creating instructions for modifying configuration settings in an actual device in an actual network corresponding to the modeled network.

28. The method of claim 22, including providing a user interface that is configured to facilitate identification of each of the one or more configuration data items.

29. The method of claim 28, wherein the user interface is configured to facilitate selection of one or more select configuration data items.

30. The method of claim 29, wherein the user interface is configured to facilitate editing of one or more select configuration data items.

31. The method of claim 28, wherein the user interface is configured to facilitate creation of new configuration data items for inclusion in the one or more other configuration data items.

32. The method of claim 28, wherein the user interface includes one or more filters that are configured to identify a select set of configuration data items from the one or more configuration data items.

33. The method of claim 32, wherein at least one of the one or more filters are configured to identify a select set of devices from the one or more devices.

34. The method of claim 32, including providing an other configuration dataset based on the select set of configuration data items.

35. The method of claim 32, including deleting one or more configuration data items of the one or more configuration data items based on the select set of configuration data items.

36. The method of claim 35, wherein each of the one or more configuration data items includes a time-based indicator, and the one or more filters include a time-based filter that identifies the select set based on the time-based indicator of each of the one or more configuration data items.

37. The method of claim 32, including creating a new baseline set of configuration data items based on the select set of configuration data items.

38. The method of claim 32, wherein the user interface is configured to modify an ordering of the one or more configuration data items based on the select set of configuration data items.

39. A computer readable medium that stores a program that, when executed on a processor, causes the processor to:
receive a compiled baseline dataset corresponding to configuration data associated with the modeled network,
display a plurality of configuration data items associated with one or more devices in a modeled network,
receive, independent of the baseline set and independent of each other, a selection of a select set of configuration data items of the plurality of configuration data items,
compile the select set of configuration data items to create one or more device datasets, and
create a configuration dataset corresponding to the modeled network based on the device datasets,
wherein creating the configuration dataset includes modifying the baseline dataset based on the device datasets.

40. The medium of claim 39, wherein creating the configuration dataset includes identifying inconsistencies between and among the baseline set and the device datasets.

41. The medium of claim 39, wherein the program causes the processor to simulate the modeled network using the configuration dataset to control operation of the one or more devices in the modeled network.

42. The medium of claim 39, wherein the program causes the processor to display a list of each of the one or more configuration data items, and a list of each of the one or more devices in the modeled network.

43. The medium of claim 39, wherein the program causes the processor to identify one or more select devices of the one or more devices corresponding to the select set of configuration data items.

44. The medium of claim 39, wherein the program causes the processor to provide an interface that facilitates at least one of:
editing a configuration data item of the select set of configuration data items;
deleting a configuration data item of the select set of configuration data items;
creating new configuration data items for inclusion in the plurality of configuration data items;
modifying configuration settings in an actual device in an actual network corresponding to the modeled network;
modifying an ordering of the display of the one or more configuration data items;
filtering a collection of configuration data items to provide the plurality of configuration items that are displayed; and
filtering an entirety of the one or more devices in the modeled network to provide the plurality of configuration items that are displayed.

45. The medium of claim 39, wherein the program causes the processor to produce an other configuration dataset based on the select set of configuration data items.

46. The medium of claim 39, wherein each of the plurality of configuration data items includes a time-based indicator, and the program enables the processor to:

receive a time-based criteria, and select the select set of configuration data items based on the time-based criteria and the time-based indicator of each of the one or more configuration data items.

47. A system that comprises a compiler that is configured to:

receive a baseline set of configuration data associated with one or more devices in a modeled network, receive, independent of the baseline set and independent of each other, one or more configuration data items associated with the one or more devices, produce a configuration dataset corresponding to the baseline set of configuration data and the one or more configuration data items, without a corresponding modification to the baseline set, and compile a composite of the baseline set and the one or more configuration data items to produce the configuration dataset.

48. The system of claim 47, wherein the compiler includes a consistency checker that is configured to identify inconsistencies between and among the baseline set and the one or more configuration data items.

49. The system of claim 47, including a network simulator that is configured to simulate the modeled network using the configuration dataset to control operation of the one or more devices in the modeled network.

50. A method comprising:

receiving, at a network analysis machine, a baseline set of configuration data associated with one or more devices in a modeled network, receiving, independent of the baseline set and independent of each other, one or more configuration data items associated with the one or more devices, and producing, by the network analysis machine, a configuration dataset corresponding to the baseline set of configuration data and the one or more configuration data items, without a corresponding modification to the baseline set, wherein producing the configuration dataset includes compiling a composite of the baseline set and the one or more configuration data items.

51. The method of claim 50, wherein producing the configuration dataset includes identifying inconsistencies between and among the baseline set and the one or more configuration data items.

\* \* \* \* \*